United States Patent
Browning

(10) Patent No.: US 10,459,087 B2
(45) Date of Patent: Oct. 29, 2019

(54) ROAD REGISTRATION DIFFERENTIAL GPS

(71) Applicant: Uber Technologies, Inc., San Francisco, CA (US)

(72) Inventor: Brett Browning, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 427 days.

(21) Appl. No.: 15/138,935

(22) Filed: Apr. 26, 2016

(65) Prior Publication Data

US 2017/0307763 A1    Oct. 26, 2017

(51) Int. Cl.
| | |
|---|---|
| G01S 19/41 | (2010.01) |
| G01S 19/42 | (2010.01) |
| G01S 19/23 | (2010.01) |
| G01S 19/48 | (2010.01) |

(52) U.S. Cl.
CPC ............. G01S 19/41 (2013.01); G01S 19/48 (2013.01)

(58) Field of Classification Search
CPC ........... G01S 19/41; G01S 19/42; G01S 19/48
USPC .... 342/174, 357.21, 357.24, 357.25, 357.62; 701/470, 473
See application file for complete search history.

(56) References Cited

U.S. PATENT DOCUMENTS

| | | |
|---|---|---|
| 5,864,214 A | 1/1999 | Brodsky |
| 6,542,111 B1 | 4/2003 | Wilson |
| 6,795,031 B1 | 9/2004 | Walker |
| 7,102,496 B1 | 9/2006 | Ernst, Jr. |
| 7,124,027 B1 | 10/2006 | Ernst, Jr. |
| 7,783,403 B2 | 8/2010 | Breed |
| 7,994,465 B1 | 8/2011 | Bamji |
| 8,145,402 B2 | 3/2012 | Craig |
| 8,245,516 B2 | 8/2012 | Anderson |
| 8,253,799 B2 * | 8/2012 | Elangovan ........... G06K 9/6202 348/157 |
| 8,559,673 B2 | 10/2013 | Fairfield |
| 9,045,041 B2 | 6/2015 | Dorum |
| 9,097,800 B1 | 8/2015 | Zhu |
| 9,145,140 B2 | 9/2015 | Ferguson |

(Continued)

FOREIGN PATENT DOCUMENTS

| | | |
|---|---|---|
| CN | 102390370 | 3/2012 |
| CN | 202394343 U | 8/2012 |

(Continued)

OTHER PUBLICATIONS

International Search Report and Written Opinion issued in PCT/US2016/066235 dated Mar. 27, 2017.

(Continued)

*Primary Examiner* — Dao L Phan
(74) *Attorney, Agent, or Firm* — Mahamedi IP Law LLP

(57) ABSTRACT

A system and method of calibrating satellite signals broadcast by one or more satellites of a satellite positioning system. The system receives sensor data from one or more sensors provided on a vehicle. The system further detects satellite signals from the one or more satellites, and determines timing offsets associated with the satellite signals from each of the one or more satellites based at least in part on the sensor data. For example, the one or more sensors may include at least one of a camera or a rangefinder, and the sensor data may correspond to a three-dimensional sensor image that may be used to determine a location of the vehicle.

16 Claims, 9 Drawing Sheets

(56) References Cited

U.S. PATENT DOCUMENTS

| | | | |
|---|---|---|---|
| 9,158,980 B1 | 10/2015 | Ferguson | |
| 9,223,013 B2 | 12/2015 | Stein | |
| 9,330,321 B2 | 5/2016 | Schamp | |
| 9,383,753 B1 | 7/2016 | Templeton | |
| 9,386,230 B1 | 7/2016 | Duran | |
| 9,442,487 B1 | 9/2016 | Ferguson | |
| 9,507,346 B1 | 11/2016 | Levinson | |
| 9,672,446 B1 | 6/2017 | Vallespi-Gonzalez | |
| 9,719,801 B1 | 8/2017 | Ferguson et al. | |
| 9,840,256 B1 | 12/2017 | Valois | |
| 9,841,763 B1 | 12/2017 | Valois | |
| 9,863,928 B1 | 1/2018 | Peterson | |
| 9,916,703 B2 | 3/2018 | Levinson | |
| 10,036,639 B1 | 7/2018 | Cox | |
| 2002/0161501 A1 | 10/2002 | Dulin | |
| 2003/0001509 A1 | 1/2003 | Leleve | |
| 2003/0040944 A1 | 2/2003 | Hileman | |
| 2003/0151547 A1* | 8/2003 | Mauro | G01S 19/25 342/357.42 |
| 2004/0133330 A1 | 7/2004 | Ono | |
| 2004/0204812 A1 | 10/2004 | Tran | |
| 2005/0010350 A1 | 1/2005 | Hiwatashi | |
| 2005/0100207 A1 | 5/2005 | Konolige | |
| 2005/0113999 A1 | 5/2005 | Tange | |
| 2005/0222744 A1 | 10/2005 | Sakata | |
| 2006/0002586 A1 | 1/2006 | Aggarwal | |
| 2006/0128087 A1 | 6/2006 | Bamji | |
| 2006/0208911 A1 | 9/2006 | Davis | |
| 2006/0223637 A1* | 10/2006 | Rosenberg | A63F 13/10 463/47 |
| 2006/0259225 A1 | 11/2006 | Ono | |
| 2007/0050121 A1 | 3/2007 | Ammon | |
| 2007/0268364 A1 | 11/2007 | Neff | |
| 2008/0040004 A1 | 2/2008 | Breed | |
| 2008/0129475 A1 | 6/2008 | Breed | |
| 2008/0162036 A1 | 7/2008 | Breed | |
| 2009/0010495 A1 | 1/2009 | Schamp | |
| 2009/0043440 A1 | 2/2009 | Matsukawa | |
| 2009/0146813 A1 | 6/2009 | Gustavo | |
| 2009/0150036 A1 | 6/2009 | Craig | |
| 2009/0216600 A1 | 8/2009 | Hill | |
| 2009/0306859 A1 | 12/2009 | Tichy | |
| 2009/0319129 A1 | 12/2009 | Ghoneim | |
| 2010/0013615 A1 | 1/2010 | Hebert | |
| 2010/0020170 A1 | 1/2010 | Higgins-Luthman | |
| 2010/0023213 A1 | 1/2010 | Mizuno | |
| 2010/0023214 A1 | 1/2010 | Horiguchi | |
| 2010/0165323 A1 | 7/2010 | Fiess | |
| 2010/0217491 A1 | 8/2010 | Naito | |
| 2010/0250052 A1 | 9/2010 | Ogino | |
| 2010/0250056 A1 | 9/2010 | Perkins | |
| 2010/0262359 A1 | 10/2010 | Motoyama | |
| 2010/0280751 A1 | 11/2010 | Breed | |
| 2010/0295946 A1 | 11/2010 | Reed | |
| 2011/0043377 A1 | 2/2011 | McGrath | |
| 2011/0060478 A1 | 3/2011 | Nickolaou | |
| 2011/0285982 A1 | 11/2011 | Breed | |
| 2012/0006610 A1 | 1/2012 | Wallace | |
| 2012/0045090 A1 | 2/2012 | Bobbitt | |
| 2012/0083959 A1 | 4/2012 | Dolgov | |
| 2012/0158313 A1 | 6/2012 | Wang | |
| 2012/0242492 A1 | 9/2012 | Grunfeld | |
| 2012/0283912 A1* | 11/2012 | Lee | B62D 1/286 701/41 |
| 2012/0327410 A1 | 12/2012 | Maston | |
| 2013/0015984 A1 | 1/2013 | Yamashiro | |
| 2013/0018575 A1 | 1/2013 | Birken | |
| 2013/0060461 A1 | 3/2013 | Wong | |
| 2013/0215115 A1 | 8/2013 | Jenkins | |
| 2013/0314503 A1 | 11/2013 | Nix | |
| 2013/0325279 A1 | 12/2013 | Fujimoto | |
| 2014/0002277 A1 | 1/2014 | Fulger | |
| 2014/0025232 A1 | 1/2014 | Cuddihy | |
| 2014/0046585 A1 | 2/2014 | Morris | |
| 2014/0081573 A1 | 3/2014 | Urmson | |
| 2014/0136414 A1 | 5/2014 | Abhyanker | |
| 2014/0188363 A1 | 7/2014 | Eckert | |
| 2014/0222298 A1 | 8/2014 | Gurin | |
| 2014/0247357 A1 | 9/2014 | Sekiguchi | |
| 2014/0302774 A1 | 10/2014 | Burke | |
| 2014/0306835 A1 | 10/2014 | Ricci | |
| 2014/0336842 A1 | 11/2014 | Jang | |
| 2014/0336935 A1 | 11/2014 | Zhu | |
| 2015/0003670 A1 | 1/2015 | Kuehnle | |
| 2015/0035985 A1 | 2/2015 | Conneely | |
| 2015/0061856 A1 | 3/2015 | Raman | |
| 2015/0112585 A1 | 4/2015 | Knepper | |
| 2015/0166072 A1 | 6/2015 | Powers | |
| 2015/0202770 A1 | 7/2015 | Patron | |
| 2015/0203107 A1 | 7/2015 | Lippman | |
| 2015/0210274 A1 | 7/2015 | Clarke | |
| 2015/0210277 A1 | 7/2015 | Ben Shalom | |
| 2015/0224845 A1 | 8/2015 | Anderson | |
| 2015/0247733 A1 | 9/2015 | Horihata | |
| 2015/0251659 A1 | 9/2015 | Fischer | |
| 2015/0266471 A1 | 9/2015 | Ferguson | |
| 2015/0331422 A1 | 11/2015 | Hartung | |
| 2015/0344038 A1 | 12/2015 | Stenneth | |
| 2016/0133131 A1 | 5/2016 | Grimm | |
| 2016/0167582 A1 | 6/2016 | Chen | |
| 2016/0176408 A1 | 6/2016 | Lynch | |
| 2016/0178802 A1 | 6/2016 | Stainvas Olshansky et al. | |
| 2016/0180171 A1 | 6/2016 | Kamata | |
| 2016/0207537 A1 | 7/2016 | Urano | |
| 2016/0357188 A1 | 12/2016 | Ansari | |
| 2016/0368504 A1 | 12/2016 | Kieren | |
| 2017/0059336 A1 | 3/2017 | Huang | |
| 2017/0090478 A1 | 3/2017 | Blayvas | |
| 2017/0126975 A1 | 5/2017 | Duran | |
| 2017/0174194 A1 | 6/2017 | Baumgaertner | |
| 2017/0243073 A1 | 8/2017 | Raghu et al. | |
| 2017/0313324 A1 | 11/2017 | Kumai | |
| 2017/0316333 A1 | 11/2017 | Levinson | |
| 2017/0351261 A1 | 12/2017 | Levinson | |
| 2017/0358204 A1 | 12/2017 | Modica | |
| 2018/0164119 A1 | 6/2018 | Becker | |

FOREIGN PATENT DOCUMENTS

| | | |
|---|---|---|
| CN | 103370249 | 10/2013 |
| CN | 104601648 A | 5/2015 |
| JP | 2005-115911 | 4/2005 |
| JP | 2006-159939 | 6/2006 |
| JP | 2008-027239 | 2/2008 |
| JP | 2008-262459 | 10/2008 |
| JP | 2009-075756 | 4/2009 |
| JP | 2015-007874 | 1/2015 |
| KR | 100862561 | 10/2008 |
| WO | WO 2013155661 A1 | 10/2013 |
| WO | WO 2014072972 | 5/2014 |
| WO | WO 2014108267 | 7/2014 |
| WO | WO 2014131400 | 9/2014 |

OTHER PUBLICATIONS

Azim Asma, et al.: "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Andres Serna et al.: "Detection, segmentation and classification of 3D urban objects using mathematical morphology and supervised learning", ISPRS Journal of Photogrammetry and Remote Sensing, vol. 93, Jul. 1, 2014, pp. 243-255, Amsterdam, NL.

EESR issued in EP 17169669.3 dated Sep. 13, 2017.

International Search Report and Written Opinion issued in PCT/US2016/031929 dated Aug. 17, 2016.

Office Action issued in EP 17169669.3 dated Jun. 18, 2018.

Hrabar, "3D path planning and stereo-based obstacle avoidance for rotorcraft UAVs", Intelligent Robots and Systems, 2008, IROS 2008. IEEE/RSJ International Conference on, Sep. 22, 200.

(56) References Cited

OTHER PUBLICATIONS

Hrabar, "An evaluation of stereo and laser-based range sensing for rotorcraft unmanned aerial vehicle obstacle avoidance", Journal of Field Rebotics, vol. 29, No. 2, Oct. 18, 2011.
Ros, et al., "Vision-Based Offline-Online Perception Paradigm for Autonomous Driving", 2015 IEEE Winter Conference on Applications of Computer Vision, IEEE, Jan. 5, 2015.
IPRP issued in PCT/US2016/066235 dated Jun. 21, 2018.
Gilbert Held, Inter- and Intra—Vehicle Communications 1st Edition, Nov. 8, 2007, Auerbach Publications, XP055503113, ISBN: 978-1-4200-5221-3, pp. ToC, Ch01, 41-50, Ch03, 93-100, Ind.
Jack Erjavec, Automotive Technology: A Systems Approach, Feb. 21, 2014, Delmar Cengage Learning, XP055506654, ISBN: 978-1-133-61231-5, pp. ToC, 616-620, 647-651, 664-668.
Hermann Winner, Handbuch Fahrerassistenzsystem: Grundlagen, Komponenten und Systeme fur aktive Sicherheit und Komfort, Apr. 20, 2015, Springer XP055506347, ISBN: 978-3-658-05733-6, pp. ToC, Ch14, Ch26-Ch29, Ch38, Ch55, Ind.
EESR issued in EP 16793475.1 dated Sep. 21, 2018.
Office Action issued in CN 201680040538.2 dated Sep. 10, 2018.
Office Action issued in CN 201710311393.1 dated Nov. 12, 2018.

* cited by examiner

ROAD REGISTRATION DIFFERENTIAL GPS

TECHNICAL FIELD

Examples described herein relate to satellite positioning systems, and more specifically to calibrating position estimates from satellite signals used in satellite positioning systems.

BACKGROUND

Satellite positioning systems (e.g., GPS, Galileo, GLONASS) typically include a constellation of satellites in non-geosynchronous orbit (NGSO) above the surface of the earth. The satellites broadcast signals that can be detected and by satellite receivers on the surface of the earth. More specifically, the satellite orbits may be arranged such that a satellite receiver at any point on the earth's surface may have a direct line of sight to at least four satellites in the constellation, ignoring occlusions such as buildings or mountains. A satellite receiver may use the satellite signals received from four or more satellites to determine its location or position on the earth's surface (e.g., using trilateration techniques). For example, the satellite receiver may calculate its distance to each of the four satellites based on the propagation times of their respective satellite signals. Thus, the accuracy of the position determination may depend on the accuracy of the timing information for each of the satellite signals.

A number of factors may affect the timing of satellite signals. For example, various weather and/or atmospheric conditions may impede (e.g., delay) the propagation of satellite signals. Tall buildings and other obstructions may further interfere with signal propagation. These factors may be hard to estimate directly and thus affect the resulting positioning estimate often introducing meters to tens of meters of error. Thus, it may be desirable to compensate for timing errors in the satellite signals received by a satellite receiver to more accurately determine the location of the receiver.

DETAILED DESCRIPTION

Figure 1:
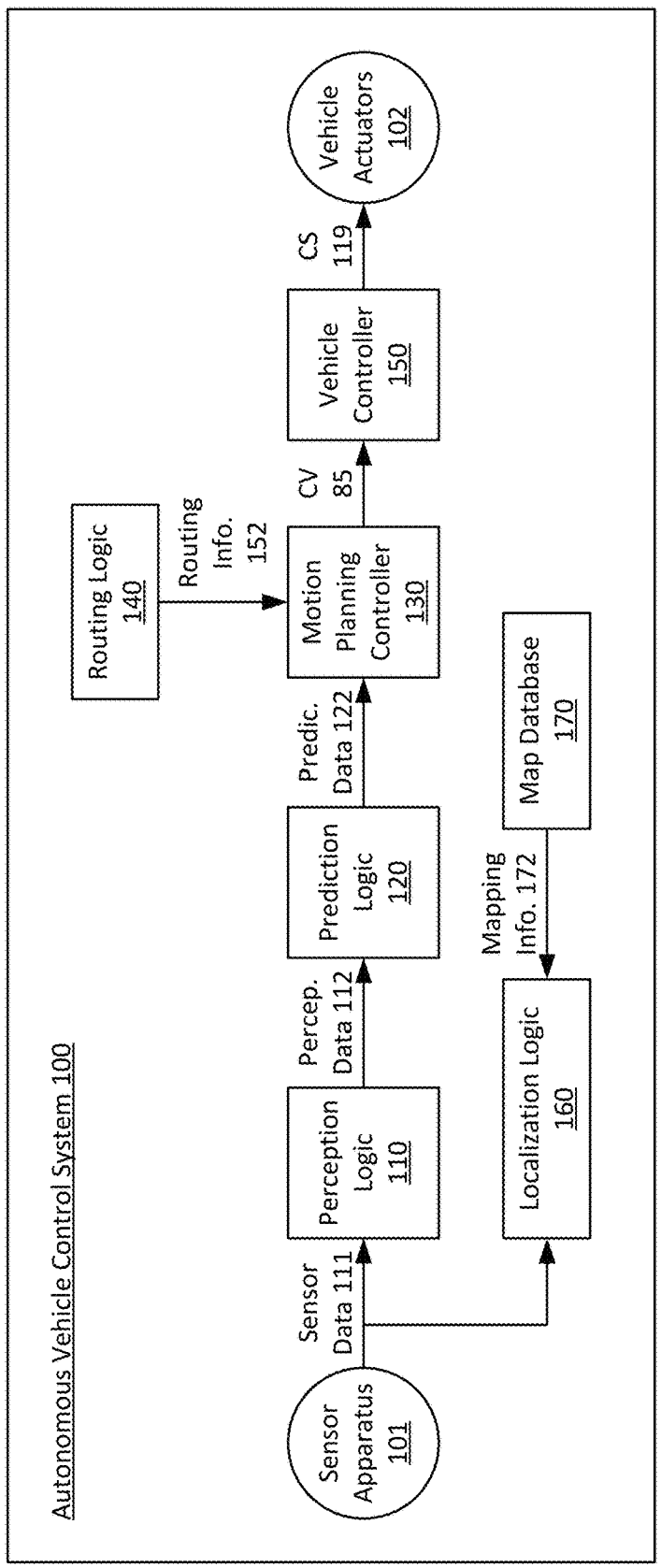
FIG. 1 shows a block diagram of a control system for operating an autonomous vehicle in accordance with example implementations.

Examples described herein provide for a sensor-based vehicle registration system that may be used to provide differential corrections for satellite positioning information broadcast by one or more satellites of a satellite positioning system. The system receives sensor data from one or more sensors provided on a vehicle and provides independent positioning estimates with respect to a map using the sensor data. The system further detects satellite signals from one or more satellites, and determines timing offsets associated with the satellite signals from each of the one or more satellites based at least in part on the sensor data. For example, the one or more sensors may include at least one of a camera or a rangefinder. In some aspects, the sensor data may correspond to a three-dimensional sensor image.

According to some examples, the system determines a location of the vehicle based at least in part on the sensor data received from the one or more sensors. For example, the system may compare the sensor data to a predetermined map of registered locations and determine a relative proximity of the vehicle to one or more of the registered locations based on the comparison. In some aspects, the predetermined map of registered locations may be generated based at least in part on previously-acquired sensor data.

In determining the timing offsets, for example, the system may calculate respective distances to each of the one or more satellites based at least in part on the location of the vehicle. The system may then calculate expected signal propagation times for satellite signals from each of the one or more satellites based at least in part on the respective distances. The system may compare the expected signal propagation times with actual signal propagation times to determine the timing offsets. In some aspects, the system may further calculate multipath reflections based on the sensor data and the location of the vehicle.

The system may communicate the timing offsets to one or more satellite receivers within a threshold proximity of the vehicle. In some aspects, the system may update the timing offsets based at least in part on movements of the vehicle. For example, as the vehicle moves across a map, from one location to another, the system may calculate new timing offsets for the satellite signals detected at a new location on the map. These new timing offsets may further be communicated to one or more satellite receivers within a threshold proximity of the new location.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components.

Alternatively, a module or component can be a shared element or process of other modules, programs or machines.

Numerous examples are referenced herein in context of an autonomous (e.g., self-driving) vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is behave given challenging surroundings of the vehicle environment. Although described herein in the context of autonomous vehicles, the example systems and methods for generating differential correction signals may be implemented by non-autonomous vehicles and/or other types of devices equipped with local sensors (e.g., cameras, laser rangefinders, radar, etc.) and satellite receivers.

As used herein, a "satellite positioning system" may refer to any satellite-based location detection and/or navigation system. More specifically, a satellite positioning system may comprise a constellation of satellites in non-geosynchronous orbit (NGSO) above the surface of the earth. The satellites broadcast signals that can be detected and used by satellite receivers to determine their respective positions on the surface of the earth (e.g., through trilateration). Examples of satellite positioning system may include, for example, global positioning system (GPS), global navigation satellite system (GLONASS), Galileo, BeiDou, etc. For purposes of discussion, the terms "satellite positioning system," "satellite system," and "GPS" may be used herein interchangeably.

System Description

FIG. 1 shows a block diagram of a control system 100 for operating an autonomous vehicle in accordance with example implementations. The control system 100 includes a sensor apparatus 101, perception logic 110, prediction logic 120, a motion planning controller 130, routing logic 140, a vehicle controller 150, localization logic 160, and a map database 170. In an example of FIG. 1, the control system 100 is used to autonomously operate a vehicle (not shown for simplicity) in a given geographic region for a variety of purposes, including transport services (e.g., transport of humans, delivery services, etc.). In examples described, an autonomously operated vehicle can drive and/or navigate without human intervention. For example, in the context of automobiles, an autonomously driven vehicle can steer, accelerate, shift, brake and operate lighting components. Some variations also recognize that an autonomous-capable vehicle can be operated autonomously, manually, or a combination of both.

In an example of FIG. 1, the control system 100 utilizes a number of sensor resources (e.g., in the sensor apparatus 101) to intelligently guide or navigate the vehicle through a given environment. For example, the sensor apparatus 101 may include a number of sensors that generate respective sensor data 111. Each sensor of the sensor apparatus 101 may capture a particular type of information about the surrounding environment. In an example of FIG. 1, the sensor apparatus 101 may include a number of camera modules that can capture still images and/or videos, a laser rangefinder that can determine distance information to nearby objects (e.g., using laser ranging techniques), an inertial measurement unit (IMU) that can detect linear acceleration and/or rotational velocities pertaining to the autonomous vehicle, and/or any other sensors that may be used to detect information about the autonomous vehicle or its surrounding environment (e.g., proximity sensors, touch sensors, photosensors, sonar, radar, rotary encoders, etc.).

In example implementations, the perception logic 110 generates perception data 112 based on the sensor data 111. More specifically, the perception logic 110 may collect and/or aggregate sensor data 111 from multiple sensors to create a more detailed description of the surrounding environment (e.g., provided as perception data 111) that can be used to more effectively navigate the vehicle through the environment. For example, the perception logic 110 may determine the relative distance of the ground or road surface to the vehicle, the type and/or composition of the road, the distance from the vehicle to the "static" environment (e.g., consisting of fixed or relatively permanent objects), etc. In some aspects, the sensor model 125 may include information pertaining to detected objects in the vicinity of the vehicle and/or contextual information about the object, surroundings, and/or geographic region, for purposes of making predictive determinations to navigate the vehicle to a particular destination while avoiding collisions.

In some aspects, the perception data 112 may include a three-dimensional (3D) sensor image of the surrounding environment. For example, the 3D sensor image may include image data, captured by multiple camera modules (e.g., of sensor apparatus 101), "stitched" together to create stereoscopic images of the surrounding environment. The stereoscopic images may be used to detect the presence, sizes, and/or distances of objects in the vicinity of the vehicle. In some examples, the image data may be combined with laser rangefinder data to produce a more complete picture of the surrounding environment. In some aspects, the laser rangefinder data may complement the image data for purposes of detecting objects that may not be detectable from the image data alone. In other aspects, the laser rangefinder data may be used to check or validate the image data, and vice-versa.

The prediction logic 120 may generate prediction data 122 based on the perception data 112. More specifically, the prediction logic 120 may use the information about the vehicle (e.g., sensor data 111) and/or knowledge about the surrounding environment (e.g., perception data 112) to predict the trajectory of the vehicle. For example, the prediction data 122 may include semantic information indicating a probable location and/or bearing of the vehicle at one or more future instances (e.g., 5, 10, or 20 seconds in the future). In some aspects, the prediction data 122 may indicate a likelihood of collision with other objects in the vicinity of the vehicle based at least in part on the vehicle's current trajectory.

The motion planning controller 130 generates vehicle commands (CV) 85 based at least in part on the prediction data 122 and routing information 152 received from the routing logic 140. In some aspects, the routing information 152 may specify a route for the vehicle to traverse (e.g., from its current location to its destination). Thus, the motion planning controller 130 may use the prediction data 122 and/or sensor data 111 to navigate the vehicle along the route specified by the routing information 152. For example, the motion planning controller 130 may control and/or plan the movements of the vehicle by issuing vehicle commands 85 (e.g., instructions) that may be used to programmatically control various electromechanical interfaces of the vehicle. In some aspects, the motion planning controller 130 may generate detailed lane geometry and control measures that impact lane control, positioning, and/or speed of the vehicle.

The vehicle commands 85 may serve as inputs to control one or more operational facets of the vehicle such as, for example, acceleration, braking, steering, shifting, and/or other auxiliary functions (e.g., interior and/or exterior lighting). More specifically, the vehicle commands 85 may specify actions that correlate to one or more vehicle control mechanisms (e.g., turning a steering column, applying brake pressure, shifting gears, etc.). In some aspects, the vehicle commands 85 may specify actions, along with attributes such as magnitude, duration, directionality, or other operational characteristics of the vehicle.

The vehicle controller 150 processes the vehicle commands 85 to control one or more operations of the vehicle. More specifically, the vehicle controller 150 may generate control signals 119 to control acceleration, steering, braking, shifting, and/or other mechanical (or electrical) functions of the vehicle. For example, while the vehicle follows a particular route, the vehicle controller 150 may continuously adjust and/or alter the movement (e.g., speed, direction, acceleration, etc.) of the vehicle in response to the vehicle commands 85 provided (e.g., in real-time) by the motion planning controller 130.

The control signals 119 may be provided as inputs to one or more vehicle actuators 102. In some aspects, each of the vehicle actuators 102 may provide drive-by-wire (DBW) functionality for a respective vehicle operation. For example, each of the vehicle actuators 102 may manage and/or control one or more mechanical components of the vehicle (e.g., engine/motor, steering column, brakes, gear selector, etc.) in response to the control signals 119. In some aspects, the vehicle actuators 120 may be response to input signals from one or more manual input mechanisms (e.g., depending on the operating mode of the vehicle). For example, when operating in autonomous mode, the vehicle actuators 102 may receive the control signals 119 from the vehicle controller. On the other, when operating in manual mode, the vehicle actuators 102 may receive the input signals from one or more manual input mechanisms (e.g., gas/brake pedals, steering wheel, gear selector, etc.).

In example implementations, the localization logic 160 may determine the vehicle's location based at least in part on the sensor data 111 generated by the one or more sensors of the sensor apparatus 101. In some aspects, the localization logic 160 may compare the sensor data 111 with pre-registered data or information associated with "known" or registered locations (e.g., mapping information 172) to identify points of interest (e.g., buildings, signs, landmarks, etc.) in the vicinity of the vehicle, and to determine a relative proximity of the vehicle to the identified points of interest. Accordingly, the localization logic 160 may determine a precise location of the vehicle based on the registered locations of the points of interest (POIs) and their respective distances from the vehicle. In other aspects, the localization logic 160 may determine the precise location of the vehicle based on the topology or surface geometry of the surrounding environment (e.g., by comparing the sensor data 111 with pre-registered mapping information 172 identifying known locations based on topology or surface geometry). As such, in one example, the routing logic 140 can determine the routing information 152 for the vehicle to travel based, at least in part, on data determined from the localization logic 160.

The map database 170 may be prepopulated with mapping information 172 for a number of POIs and/or surface geometries. In some aspects, the mapping information 172 stored in the map database 170 may be dynamically updated based on sensor data 111 acquired from the sensor apparatus 101. For example, localization logic 160 may determine more detailed descriptions of existing POIs and/or surface geometries, and may identify new POIs and/or surface geometries, based on the sensor data 111 generated as the vehicle navigates through a given environment. Thus, the sensor data 111 may be correlated with location information and stored in the map database 170 (e.g., as mapping information 172).

Specifically, the localization logic 160 may determine the location of the vehicle based on local sensor data (e.g., used for machine vision), without the aid of satellite positioning information. However, in some aspects, the localization logic 160 may use the vehicle's location to determine the accuracy of satellite signals broadcast by one or more satellites of a satellite positioning system. As described above, weather, atmospheric conditions, buildings, and/or various other obstructions may interfere with (e.g., impede) the propagation of satellite signals directed toward the surface of the earth. Additionally, there may be inherent inaccuracies in the trajectories of the satellites. Thus, the example implementations recognize that the sensor-based location information may be more accurate and precise than position information derived from the received satellite signals.

In some implementations, the localization logic 160 may compare the sensor-based location information with corresponding satellite positioning information to determine a correction factor (e.g., timing offset) that may be applied to each of the satellite signals to correct any inaccuracies inherent in the satellite positioning information. For example, the correction factors may indicate adjustments to be made to the received satellite signals in order to derive a more accurate position reading. In some aspects, the localization logic may further calculate and/or correct for multipath reflections based on the sensor data and the location of the vehicle.

Further, it may be assumed that other satellite receivers within a threshold proximity of the vehicle associated with the localization logic 160 (e.g., the "registered vehicle") receive the same satellite signals, under the same conditions, as the registered vehicle. Thus, in some aspects, the localization logic 160 may communicate the correction factors to other satellite receivers in the vicinity (e.g., via the network service), to enable the satellite receivers to calibrate their received satellite signals with respect to the known location of the registered vehicle.

Figure 2:
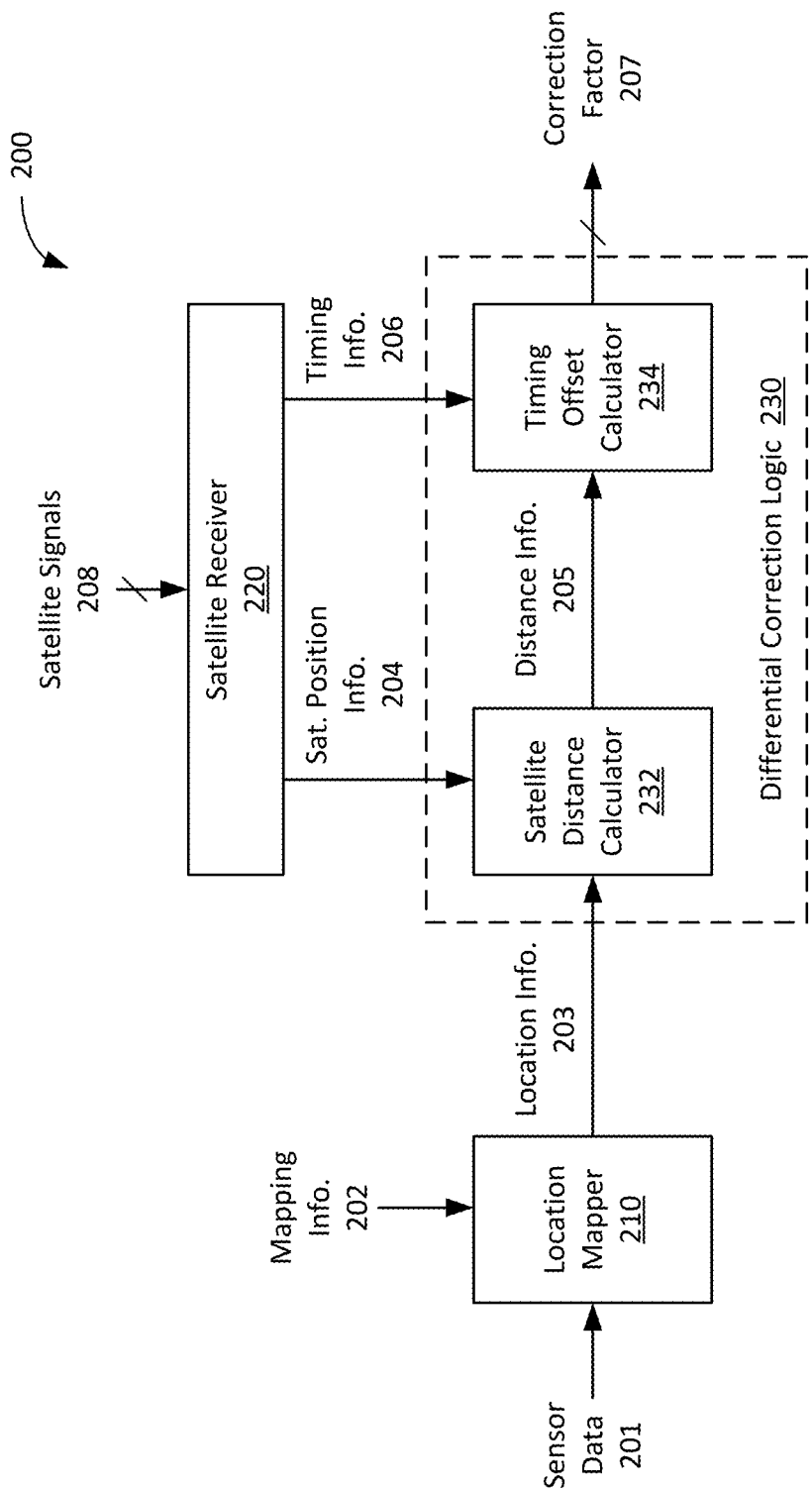
FIG. 2 shows a block diagram of a sensor-based differential correction system in accordance with example implementations.

FIG. 2 shows a block diagram of a sensor-based differential correction system 200 in accordance with example implementations. In one example, the sensor-based (SB) differential correction system 200 may be implemented by the localization logic 160 of FIG. 1. Alternatively, in another example, the SB differential correction system 200 may be in communication with the localization logic 160. For example, the SB differential correction system 200 may be provided on an autonomous vehicle equipped with a plurality of local sensors (e.g., cameras, laser rangefinders, radar, etc.). In some aspects, the SB differential correction system 200 may be used to determine a location of the corresponding vehicle based at least in part on sensor data generated by the local sensors. In other aspects, the SB differential correction system 200 may be used to calibrate satellite signals received from one or more satellites of a satellite positioning system (not shown for simplicity).

The SB differential correction system 200 includes a location mapper 210, a satellite receiver 220, and differential correction logic 230. The location mapper 210 receives sensor data 201 from a set of local sensors and determines location information 203 for the vehicle based at least in part on the sensor data 201. For example, the sensor data 201 may be used to guide or navigate a vehicle through a given environment. In some aspects, the sensor data 201 may correspond to "raw" sensor data 111 from the sensor apparatus 101 (e.g., cameras, laser rangefinders, IMUs, etc.) provided on an autonomous vehicle. In other aspects, the sensor data 201 may correspond to a 3D sensor image of the vehicle's surrounding environment.

In some implementations, the location mapper 210 may compare the sensor data 201 with mapping information 202 (e.g., from map database 170) to determine the location information 203. The example implementations recognize that the sensor data 201 may provide a detailed and accurate description of a vehicle's surrounding environment (e.g., to enable autonomous navigation and/or driving). More specifically, the sensor data 201 may be matched with corresponding descriptions of known locations to determine the precise location of the vehicle. In some aspects, the mapping information 202 may include descriptions (e.g., shape, size, color, and/or other descriptive data such as image data) and locations (e.g., longitude, latitude, and/or other coordinate data such as map data) of known POIs. In other aspects, the mapping information 202 may include descriptions of surface geometry and/or other identifiable features of a particular location.

The location mapper 210 may compare the sensor data 201 (e.g., image data captured by one or more cameras) with mapping information 202 to determine which, if any, of the known POIs and/or surface geometries are located in the vicinity of the vehicle. The location mapper 210 may further determine, from the sensor data 201 (e.g., distance data captured by one or more laser rangefinders), a relative proximity of the vehicle to each of the one or more POIs and/or surface geometries in the vicinity of the vehicle. The location mapper 210 may then extrapolate the location information 203 for the vehicle based on the known locations of the POIs and/or surface geometries (e.g., as determined from the mapping information 202) and their respective distances from the vehicle.

The satellite receiver 220 may receive satellite signals 208 from one or more satellites of a satellite positioning system (e.g., GPS). Each satellite signal 208 may include a pseudorandom number sequence that may be used to calculate the propagation time of the satellite signal (e.g., from a corresponding satellite to the satellite receiver 220). More specifically, each satellite signal 208 may include satellite position information 204 indicating the position (e.g., in space) of the corresponding satellite at the time the pseudorandom sequence was transmitted, and timing information 206 indicating a time of transmission (TOT) of the pseudorandom sequence. In some aspects, the timing information 206 may further include a time of arrival (TOA) of the pseudorandom sequence. For example, the satellite receiver 220 may calculate the TOA by comparing the pseudorandom sequence in the received signal 208 with an internally-generated pseudorandom sequence that is synchronized with a local clock.

In example implementations, the differential correction logic 230 may use the location information 203 to generate differential correction signals 207 for each of the received satellite signals 208. For example, the differential correction logic 230 may compare the sensor-based location information 203 (e.g., derived from the sensor data 201) with satellite-based location information (e.g., based on the satellite signals 208) in order to calibrate the satellite signals 208 to be used to derive a more accurate and/or precise location estimation. The differential correction logic 230 may include a satellite distance calculator 232 to determine the distance from the vehicle to a corresponding satellite, and a timing offset calculator 234 to detect errors (e.g., delays) in the propagation time of a satellite signal.

The satellite distance calculator 232 may compare the location information 203 for the vehicle with the satellite position information 204 for a particular satellite to determine the distance (D) from the vehicle to the particular satellite. As described above, the example implementations presume that the sensor-based location information 203 provides a highly accurate and precise indication of the vehicle's actual location. Thus, the distance information 205 may describe the "actual" distance between the vehicle and the corresponding satellite.

The timing offset calculator 234 may use the distance information 205 to determine the accuracy of the timing information 206 provided by corresponding satellite signals 208. For example, the timing offset calculator 234 may determine the actual propagation time ($T_A$) of a particular satellite signal 208 by comparing the signal's TOT to the signal's TOA (e.g., $T_A$=TOA−TOT). The timing offset calculator 234 may further determine an expected propagation time ($T_E$) of the particular satellite signal 208 based on the distance information 205 (e.g., $T_E$=D/c, where c=speed of light). Finally, the timing offset calculator 234 may determine a differential correction factor 207 (e.g., timing offset) associated with the satellite signals 208 of the particular satellite based on the difference between the actual propagation time and the expected propagation time (e.g., correction factor=$T_A$−$T_E$).

The correction factor 207 may be used by the satellite receiver 220 and/or other satellite receivers in the vicinity (not shown) to adjust and/or calibrate the satellite signals 208. For example, in some aspects, the satellite receiver 220 may determine the location of the vehicle by calculating respective distances from the vehicle to each of four or more satellites (e.g., using well-known trilateration techniques). More specifically, the satellite receiver 220 may calculate its distance to each satellite based on the satellite position information 204 and timing information 206 from corresponding satellite signals 208 broadcast by the satellite. As described above, weather, atmospheric conditions, buildings, and/or other obstructions may introduce delays in the actual propagation times (e.g., TOA) of the received satellite signals 208. However, the satellite receiver 220 may offset such delays by adjusting the timing information 206 (e.g., TOA) based on the correction factor 207. This may enable the satellite receiver 220 to derive more accurate timing information, and thus a more accurate location of the vehicle, from the received satellite signals 208.

Figure 3:
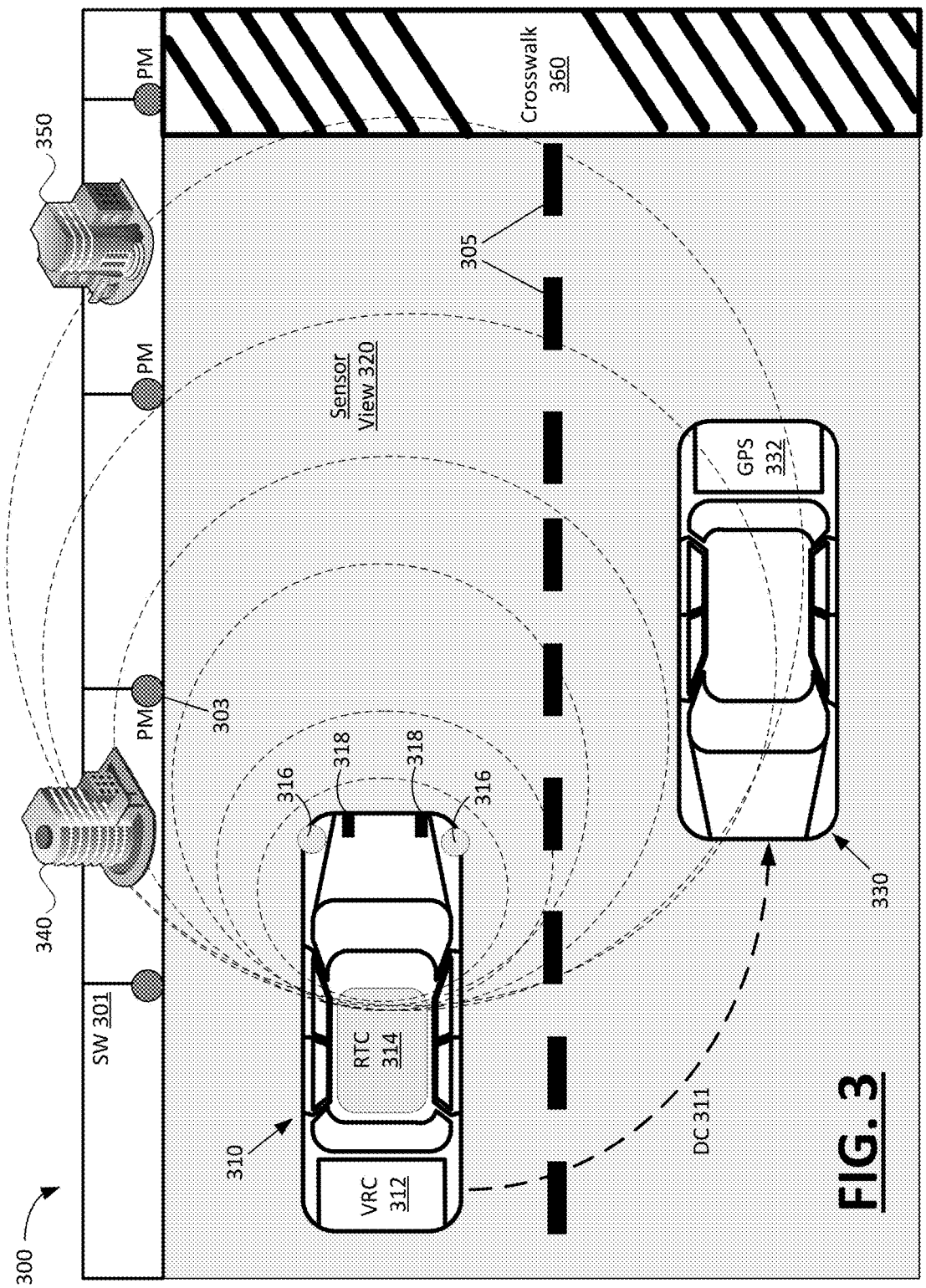
FIG. 3 shows a map diagram depicting an example autonomous vehicle that uses sensor data to navigate an environment.

FIG. 3 shows a map diagram 300 depicting an example autonomous vehicle 310 that uses sensor data to navigate an environment. In an example of FIG. 3, the autonomous vehicle 310 may include various sensors, such as a roof-top camera array (RTC) 314, front-facing cameras 316 and laser rangefinders 318. In some aspects, the autonomous vehicle 310 may also include a vehicle registration controller (VRC) 312, which may be used to determine a location of the autonomous vehicle 310 based at least in part on sensor data acquired from the various sensors 314-318. The VRC 312 may be an example implementation of the localization logic 160 of FIG. 1 and/or the sensor-based differential correction system 200 of FIG. 1.

According to an example, the vehicle 310 uses one or more sensor views 320 (e.g., sensor data from cameras, rangefinders, IMUs, and/or other local sensors provided on the vehicle 310) to scan a road segment on which the vehicle 310 is about to traverse. The vehicle 310 may process image data, corresponding to the sensor views 320 from one or more sensors in order to detect objects that are, or may potentially be, in the path of the vehicle 310. For example, based on the sensor views 320, the autonomous vehicle 310 may detect another vehicle 330 which may potentially cross into a road segment on which the vehicle 310 is about to traverse. The autonomous vehicle 310 may use information about the road segment and/or image data from the sensor views 320 to determine that the road segment includes a divider 305 and an opposite lane, as well as a sidewalk (SW) 301 and sidewalk structures such as parking meters (PM) 303.

According to some examples, the autonomous vehicle 310 may determine a probability that one or more objects in the environment will interfere or collide with the autonomous vehicle 310 along the vehicle's current path or route. In some aspects, the autonomous vehicle 310 may selectively perform an avoidance action based on the probability of collision. The avoidance actions may include velocity adjustments, lane aversion, roadway aversion (e.g., change lanes or driver far from curb), light or horn actions, and other actions. For example, the autonomous vehicle 310 may reduce its speed upon detecting a crosswalk 360 in the sensor view 320 (e.g., based on a greater likelihood of pedestrians crossing the road). In some aspects, the avoidance action may run counter to certain driving conventions and/or rules (e.g., allowing the autonomous vehicle 310 to drive across center line to create space with a bicyclist).

The autonomous vehicle 310 may determine the location, size, and/or distance of objects in the environment based on the sensor views 320. For example, the sensor views 320 may be 3D sensor images that combine sensor data from the roof-top camera array 314, front-facing cameras 316, and/or laser rangefinders 318. In some implementations, the autonomous vehicle 310 may update the sensor views 320 in real-time as the autonomous vehicle 310 moves along its designed route. Accordingly, the autonomous vehicle 310 may precisely and accurately detect the presence of objects in the environment, allowing the autonomous vehicle 310 to safely navigate the route while avoiding collisions with other objects.

In example implementations, the autonomous vehicle 310 may also determine points of interest (POIs) in the vicinity of the vehicle 310, based at least in part on the sensor views 320. For example, a POI may be any building, structure, object, or feature that is uniquely identifiable on a map. In some aspects, the VRC 312 may process the sensor data from the various sensors 314-318 to identify buildings 340 and/or 350 as POIs in the sensor views 320. For example, based on the size, shape, and/or architectural design of the individual buildings 340 and 350, the VRC 312 may identify building 340 as a hospital building and may further identify building 350 as a school building.

The example implementations recognize that buildings and other POIs may have relatively fixed and/or permanent locations. Thus, in some aspects, the VRC 312 may determine the location of the autonomous vehicle 310 based at least in part on the relative locations of one or more POIs in the vicinity of the vehicle 310. For example, the hospital building 340 may have a unique street address and/or geographic coordinates (e.g., longitude and latitude positions) that describe the location hospital building 340 on the map 300. Similarly, the school building 350 may also have a unique street address and/or geographic coordinates that describe the location of the school building 350 on the map 300. The VRC 312 may determine the relative proximity (e.g., distance) of the autonomous vehicle 310 to each of the buildings 340 and 350 based at least in part on sensor data from the various sensors 314-318 and/or sensor views 320. Thus, based on the known locations of the buildings 340 and 350, and the relative proximity of the autonomous vehicle 310 to the buildings 340 and/or 350, the VRC 312 may determine the location of the vehicle 310 with a relatively high degree of accuracy and precision.

In some aspects, the VRC 312 may use the location of the autonomous vehicle 310 to calibrate satellite signals received from one or more satellites of a satellite positioning system (e.g., GPS). For example, in some implementations, the autonomous vehicle 310 and/or VRC 312 may include a satellite receiver that receives the satellite signals from the one or more satellites (not shown for simplicity). As described above with respect to FIG. 2, the VRC 312 may use the location of the autonomous vehicle 310 to determine differential correction (DC) signals 311 that may be used to calibrate the received satellite signals. For example, the DC signals 311 may include timing offsets to be applied to the received satellite signals to offset any propagation delays in the received satellite signals (e.g., to acquire more accurate and/or precise positioning information from the satellite signals).

Still further, in some aspects, the VRC 312 may communicate the DC signals 311 to one or more GPS receivers within a threshold proximity of the autonomous vehicle 310. In the example of FIG. 3, the VRC 312 may communicate the DC signals 311 to a GPS receiver 332 provided on vehicle 330. In some implementations, the VRC 312 may directly broadcast the DC signals 311 to other GPS receivers within range using one or more short-range wireless communication protocols (e.g., Wi-Fi, Bluetooth, NFC, etc.). In other implementations, the VRC 312 may upload the DC signals 311 to a network (e.g., mapping or navigation) service, which may then broadcast the DC signals 311 to one or more GPS receivers in a given geographic region (e.g., using Wi-Fi, satellite, and/or cellular communication protocols).

In yet another embodiment, the VRC 312 may communicate its sensor data (e.g., sensor views 320) and corresponding satellite positioning information to the network service. The network service may calculate the timing offsets for the satellite signals based on the vehicle's sensor data. Accordingly, the network service may broadcast the timing offset information (e.g., as DC signals 311) to other vehicles in the vicinity of the registered vehicle 310.

Due to their relatively close proximity, it is likely that the vehicle 330 and the autonomous vehicle 310 have a direct line of sight to the same satellites of the satellite positioning system. Thus, the satellite signals detected by the GPS receiver 332 may undergo the same propagation delays and/or interference as the satellite signals detected by the VRC 312. Accordingly, the GPS receiver 332 may use the DC signals 311 generated by the VRC 312 to derive more accurate positioning information for the vehicle 330 based on the received satellite signals.

By using an autonomous vehicle's on-board GPS receiver as a reference for performing differential correction of satellite signals, the example implementations may provide many advantages over conventional differential GPS systems that use dedicated base stations (e.g., with well-known fixed locations) as references. For example, the vehicle-based differential correction techniques described herein may leverage existing vehicle sensors (e.g., sensors 314-318) and/or sensor data (e.g., sensor views 320) to determine a precise reference location for received satellite signals. Furthermore, the sensor data may be continuously and/or periodically updated (e.g., in real-time) as the vehicle moves through a given environment. Thus, the example implementations may lower the deployment costs, while increasing scalability, of differential GPS systems. Still further, in some aspects, the example implementations may improve and/or complement existing differential GPS systems (e.g., that use pre-registered base stations with fixed locations).

Figure 4:
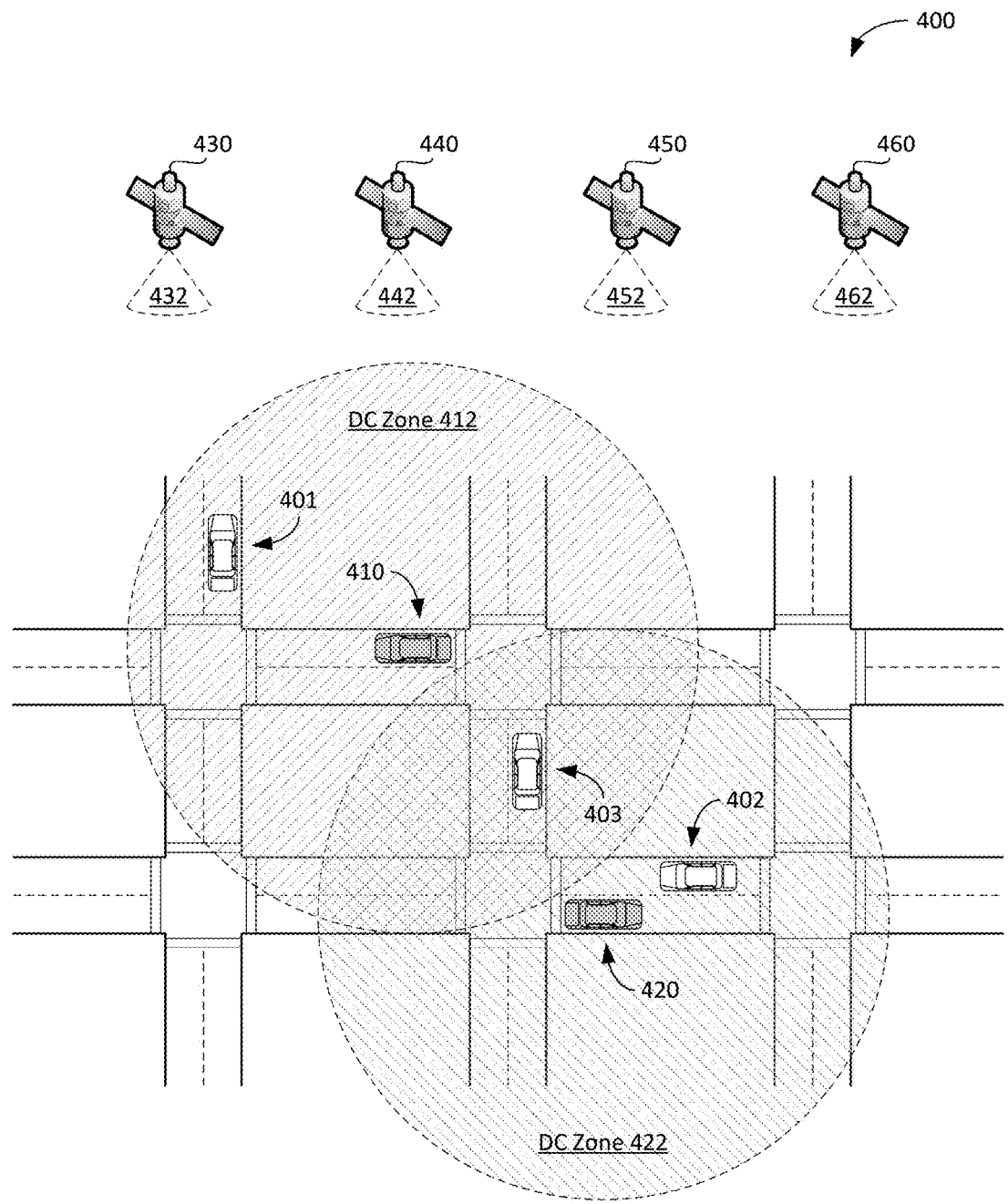
FIG. 4 shows a map diagram depicting a distributed differential correction system in accordance with example implementations.

FIG. 4 shows a map diagram 400 depicting a distributed differential correction (DC) system in accordance with example implementations. The distributed DC system includes a number of registered vehicles 410 and 420 that report or register their respective locations to a network (e.g., mapping or navigation) service. Each of the registered vehicles 410 and 420 may be an example implementation of the autonomous vehicle 310 of FIG. 3 and/or may include features of the autonomous vehicle 310 (e.g., sensors 314-318 and VRC 312). Although only two registered vehicles 410 and 420 are shown in the example of FIG. 4, for simplicity, the distributed DC system may include any number of registered vehicles.

In example implementations, each of the registered vehicles 410 and 420 may use on-board vehicle sensors (e.g., cameras, laser rangefinders, IMUs, etc.) to determine their respective locations on the map 400. For example, in some aspects, the on-board vehicle sensors may generate sensor data (e.g., 3D sensor images) that may be used to navigate and/or drive the vehicles 410 and 420 through a given environment. The registered vehicles 410 and 420 may also include satellite receivers to receive satellite signals 432, 442, 452, and 462 broadcast by respective satellites 430, 440, 450, and 460 of a satellite positioning system. In some aspects, each of the vehicles 410 and 420 may detect timing offsets in the received satellite signals 432, 442, 452, and 462 based on the known locations of the vehicles 410 and 420 (e.g., as described above with respect to FIGS. 2 and 3).

Each of the registered vehicles 410 and 420 may communicate the timing offset information (e.g., as differential correction signals) to other GPS receivers within a threshold range. For example, the first registered vehicle 410 may communicate its DC signals to any GPS receivers within a first DC zone 412. Similarly, the second registered vehicle 420 may communicate its DC signals to any GPS receivers within a second DC zone 422. The example implementations recognize that, although the registered vehicles 410 and 420 may receive the same satellite signals 432, 442, 452, and 462, the signal delays experienced by each of the vehicles 410 and 420 may differ based on their respective locations on the map 400. The example implementations further recognize that the first registered vehicle 410 may receive satellite signals from one or more additional satellites that are not in communications range with the second registered vehicle 420, and vice-versa. Thus, the DC signals generated by the first registered vehicle 410 (e.g., broadcast within the first DC zone 412) may differ from the DC signals generated by the second registered vehicle 420 (e.g., broadcast within the second DC zone 422).

In the example of FIG. 4, a number of non-registered vehicles 401-403 are located throughout the map 400. For purposes of discussion, it may be assumed that each of the vehicles 401-403 also receives the satellite signals 432, 442, 452, and 462 broadcast by the satellites 430, 440, 450, and 460, respectively. More specifically, the first vehicle 401 is located within the first DC zone 412, the second vehicle 402 is located within the second DC zone 422, and the third vehicle 403 is located within both DC zones 412 and 422. Accordingly, the first vehicle 401 may receive the DC signals (e.g., timing offset information) generated by the first registered vehicle 410, and may calibrate its received satellite signals 432, 442, 452, and 462 based on the timing offset information (e.g., as described above with respect to FIG. 3). The second vehicle 402 may receive the DC signals (e.g., timing offset information) generated by the second registered vehicle 420, and may calibrate its received satellite signals 432, 442, 452, and 452 based on the corresponding timing offset information (e.g., as described above with respect to FIG. 3).

In some aspects, the third vehicle 403 may receive DC signals from both the first registered vehicle 410 and the second registered vehicle 420. For example, the third vehicle 403 may combine the timing offset information included with the DC signals generated by both registered vehicles 410 and 420 in determining the timing offsets to be applied to its received satellite signals 432, 442, 452, and 462. Averaging the timing offsets detected by each of the registered vehicles 410 and 420 may produce timing offsets that are more accurate and/or applicable for the third vehicle 403 (e.g., and any other GPS receiver at the intersection of the first DC zone 412 and the second DC zone 422).

In general, the timing offset information calculated by a particular registered vehicle may be less accurate and/or applicable for GPS receivers located farther from the registered vehicle (e.g., at the edge of the corresponding DC zone). However, in the example implementations, GPS receivers located at the intersection (e.g., edges) of multiple DC zones may have access to more timing offset data (e.g., from multiple registered vehicles) to more accurately calibrate their received satellite signals. Furthermore, as the registered vehicles move about the map 400, there is a high likelihood that their respective DC zones will intersect and/or overlap with the DC zones of other registered vehicles. Thus, the example implementations may provide a more even distribution of timing offset information across the map 400.

In some aspects, the differential correction system may be managed by a network service (not shown for simplicity) in communication with each of the registered vehicles 410 and 420. For example, the network service may receive sensor-based location information from each of the registered vehicles 410 and 420, and may register the locations of the vehicles 410 and 420 on the map 400 based on the received location information. The network service may further receive the DC signals generated by each of the registered vehicles 410 and 420, and may broadcast the DC signals to GPS receivers within the respective DC zones 412 and 422. In some aspects, the network service may further combine or aggregate DC signals from multiple registered vehicles 410 and 420 to provide more accurate timing offset information to a particular region of the map 400 (e.g., the intersection of DC zones 412 and 422).

Figure 5:
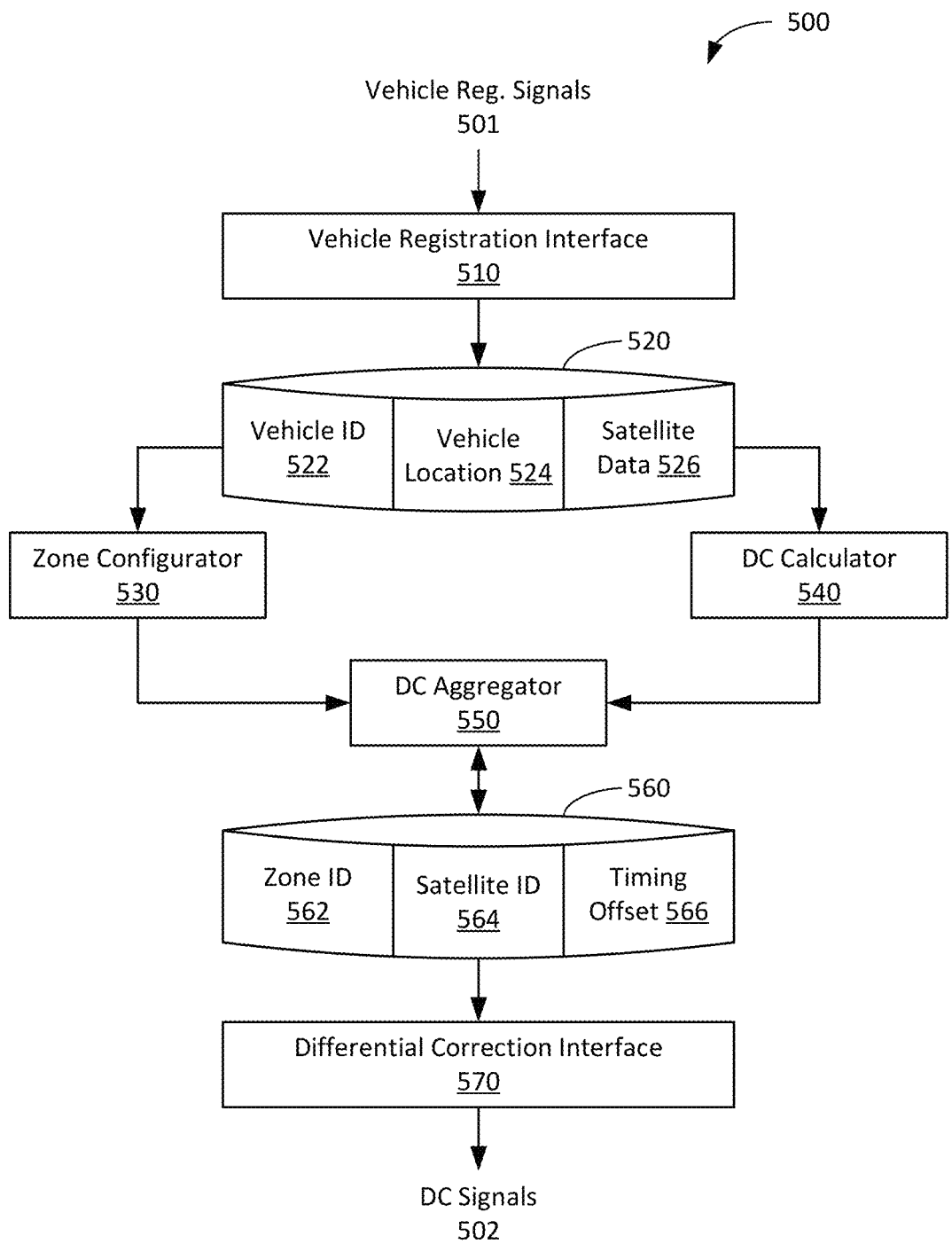
FIG. 5 shows a block diagram of a vehicle registration system in accordance with example implementations.

FIG. 5 shows a block diagram of a vehicle registration system 500 in accordance with example implementations. In some aspects, the vehicle registration system 500 may provide vehicle locating services for registered vehicles. In other aspects, the vehicle registration system 500 may provide satellite calibration services for non-registered vehicles (e.g., and registered vehicles). According to an example, the vehicle registration system 500 can be implemented by a set of computing systems (e.g., servers) that are remote from the registered vehicles and in communication with the registered vehicles (over one or more networks). The vehicle registration system 500 includes a vehicle registration interface 510, a vehicle database 520, a zone configurator 530, a differential correction (DC) calculator 540, a DC aggregator 550, a satellite database 560, and a differential correction interface 570.

The vehicle registration interface 510 may receive vehicle registrations signals 501 from one or more registered vehicles (e.g., registered vehicle 310 of FIG. 3 and/or registered vehicles 410 and 420 of FIG. 4). The vehicle registration signals 501 may include, for example, vehicle identification (ID) information, sensor-based (SB) location information, and satellite information. The vehicle ID may identify the registered vehicle associated with a particular vehicle registration signal 501. The SB location information may describe the location of the vehicle, determined based on locally-generated sensor data (e.g., as described above with respect to FIGS. 2 and 3). The satellite information may describe any satellite signals detected or received by the registered vehicle (e.g., satellite position information 204 and timing information 206 of FIG. 2).

The vehicle database 520 may store the information provided with the vehicle registration signals 501. For example, a vehicle locator service, user, and/or owner associated with one or more registered vehicles may access the information stored in the vehicle database 520 to determine the location of the one or more registered vehicles. In some aspects, the vehicle database 520 may include a vehicle ID partition 522, a vehicle location partition 524, and a satellite date partition 526. The vehicle ID partition 522 may store the vehicle IDs for one or more registered vehicles. The vehicle location partition 524 may store vehicle location information for the one or more registered vehicles. The satellite data partition 526 may store information associated with any satellite signals detected by the one or more registered vehicles.

In example implementations, the vehicle registration system 500 may provide differential correction information to GPS receivers in the vicinity of the one or more registered vehicles. In some aspects, the vehicle registration system 500 may generate differential correction signals for different regions of a map by aggregating satellite data received from registered vehicles within each map region. For example, the zone configurator 530 may subdivide a map into one or more DC zones or regions based, at least in part, on an availability of registered vehicles and/or satellite data in each zone. The DC calculator 540 may calculate differential correction information for each registered vehicle in the vehicle database 520 based on the location of the vehicle and the satellite data received by the vehicle (e.g., as described above with respect to FIG. 2). The DC aggregator 550 may then combine or aggregate the differential correction information for the registered vehicles within each zone to determine differential correction information to be broadcast to all GPS receivers within a particular zone.

Figure 6:
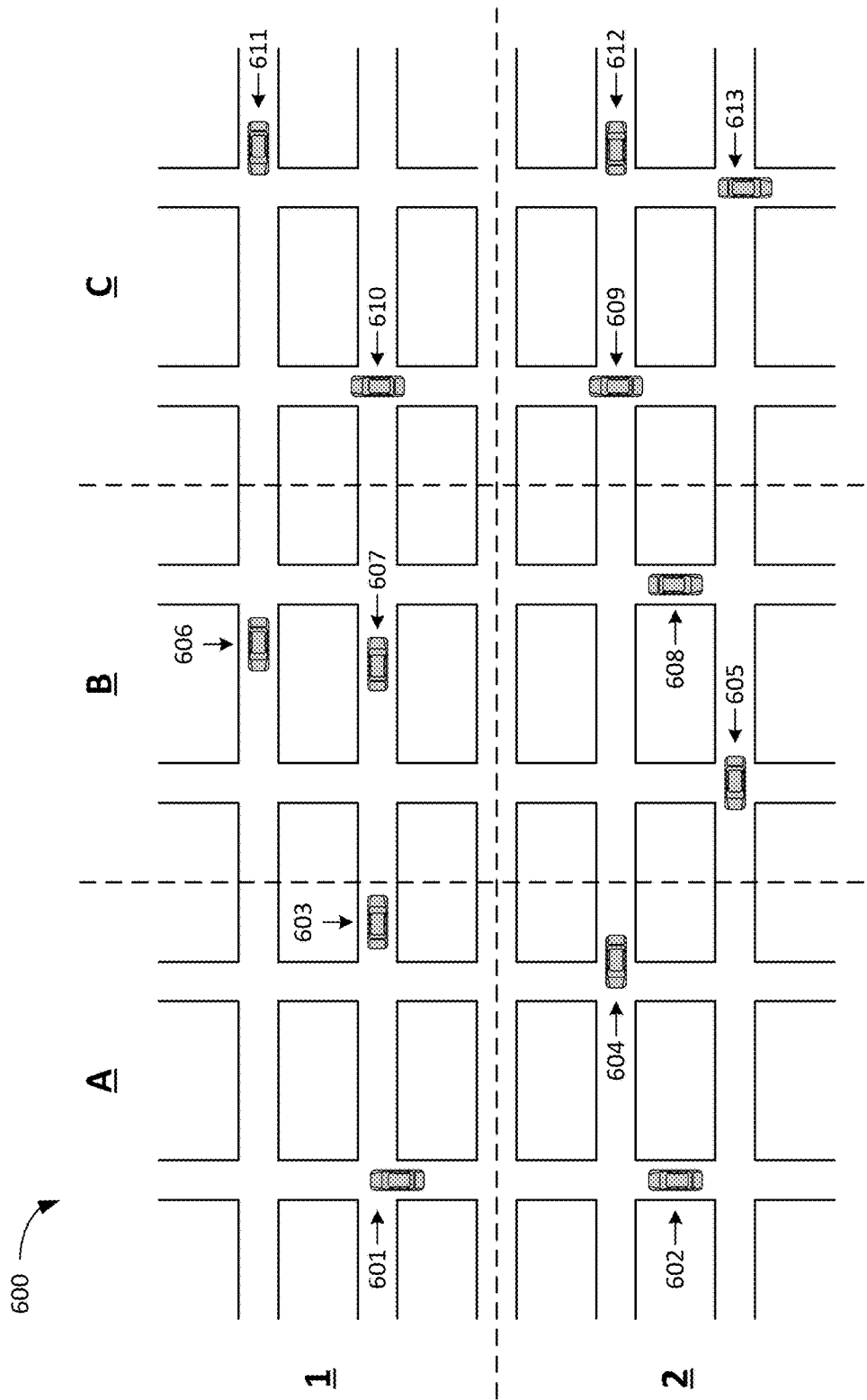
FIG. 6 shows a map diagram depicting an example distribution of registered vehicles of a vehicle registration system.

With reference to the example map diagram 600 of FIG. 6, the vehicle registration system 500 may receive vehicle registration signals 501 from a number of registered vehicles 601-613 located throughout the map 600. Each of the vehicles 601-613 may determine their respective locations based on locally-generated sensor data. Furthermore, each of the vehicles 601-613 may detect satellite signals from one or more satellites of a satellite positioning system (not shown for simplicity). In the example of FIG. 6, the zone configurator 530 may partition the map 600 into six regions (e.g., DC zones) A1, A2, B1, B2, C1, and C2. The DC calculator 540 may calculate timing offsets (e.g., differential correction information) for satellite signals received by each of the vehicles 601-613 based on their respective locations. The DC aggregator 550 may further combine the differential correction information for multiple registered vehicles within each zone.

For example, the DC aggregator 550 may combine the differential correction information (e.g., generated by the DC calculator 540) for vehicles 601 and 603 in zone A1. The DC aggregator 550 may combine the differential correction information for vehicles 602 and 604 in zone A2. The DC aggregator 550 may combine the differential correction information for vehicles 606 and 607 in zone B1. The DC aggregator 550 may combine the differential correction information for vehicles 605 and 608 in zone B2. The DC aggregator 550 may combine the differential correction information for vehicles 610 and 611 in zone C1. The DC aggregator 550 may combine the differential correction information for vehicles 609, 612, and 613 in zone C2.

When combining differential correction information for multiple vehicles, the DC aggregator 550 may average the timing offsets for any satellite signals commonly detected by the vehicles in a particular region. For example, in zone A1, vehicles 601 and 603 may detect satellite signals from many of the same satellites. These satellite signals may be referred to herein as "shared" satellite signals. Thus, for some implementations, the DC aggregator 550 may average the timing offsets for the shared satellite signals in zone A1.

The satellite database 560 may store the differential correction information generated by the DC aggregator 550. In some aspects, the satellite database 560 may include a zone identification (ID) partition 562, a satellite identification (ID) partition 564, and a timing offset partition 566. The zone ID partition 562 may store information identifying or describing the DC zones or regions (e.g., A1, A2, B1, B2, C1, C2) of a particular map. The satellite ID partition 564 may store information identifying the satellites that were detected by registered vehicles within a particular DC zone or region. The timing offset partition 566 may store timing offset information (e.g., differential correction information) for satellite signals broadcast by the satellites associated with a particular DC zone or region. In some aspects, the vehicle registration system 500 may update the information stored in the satellite database 560 with more current or updated information based on movements of the registered vehicles (e.g., as the vehicles move across the different zones or regions).

The differential correction interface may communicate DC signals 502 to any GPS receivers within the vicinity of one or more registered vehicles. For example, the DC signals 502 may include timing offset information (e.g., stored in the timing offset partition 566) that may be used to calibrate (e.g., correct the timing of) one or more satellite signals, and satellite identification information identifying the satellites associated with the one or more satellite signals. In example implementations, the differential correction interface 570 may broadcast the DC signals 502 to each of the DC zones such that any GPS receivers within a particular DC zone may receive the same differential correction information. For example, a first set of DC signals 502 may be broadcast to zone A1, a second set of DC signals 502 may be broadcast to zone A2, a third set of DC signals 502 may be broadcast to zone B1, a fourth set of DC signals 502 may be broadcast to zone B2, a fifth set of DC signals 502 may be broadcast to zone C1, and a sixth set of DC signals 502 may be broadcast to zone C2.

Methodology

Figure 7:
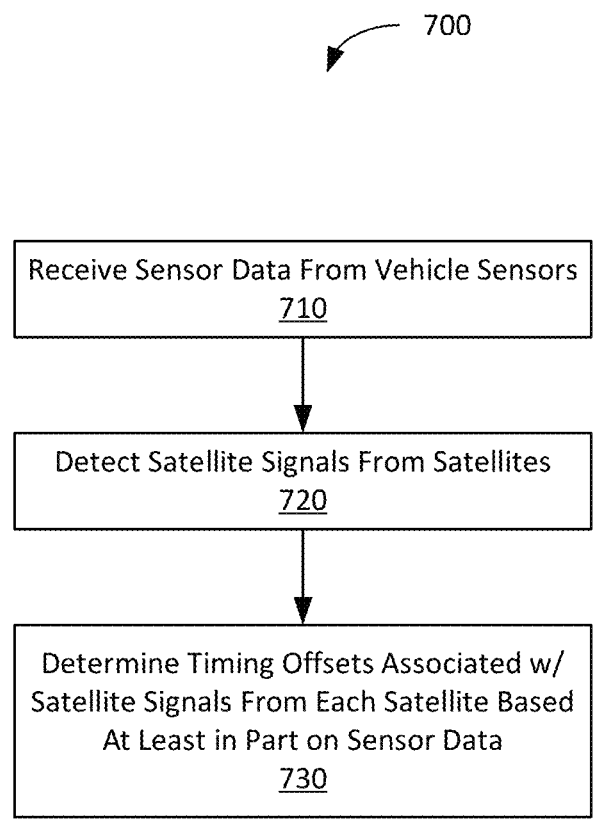
FIG. 7 shows a flowchart of an example operation for calibrating satellite signals based on vehicle sensor data.

FIG. 7 shows a flowchart of an example operation 700 for calibrating satellite signals based on vehicle sensor data. The operation 700 may be implemented, for example, by the localization logic 160 of FIG. 1. Accordingly, references made herein to the elements of FIG. 1 are for purposes of illustrating a suitable element or component for performing a step or sub-step being described.

The localization logic 160 receives sensor data from one or more vehicle sensors (710). For example, the sensor data may correspond to the sensor model 125 (e.g., a 3D sensor image) and/or raw sensor data 111-115 generated by the local sensor apparatuses 101-105 (e.g., cameras, laser rangefinders, IMUs, etc.) of the autonomous vehicle control system 100. In some aspects, the sensor data may be used (e.g., by the vehicle control logic 128) to navigate and/or drive an autonomous vehicle through a given environment. Thus, the sensor data may provide a detailed and accurate description of the vehicle's surrounding environment.

The localization logic 160 further detects satellite signals from one or more satellites of a satellite positioning system (720). For example, each satellite signal may include satellite position information, indicating the position (e.g., in space) of a corresponding satellite, and timing information, indicating when the satellite signal was transmitted. A satellite (e.g., GPS) receiver may receive the satellite signals, and may calculate its own position on the surface of the earth based on the satellite position information and timing information provided by the satellite signals (e.g., using well-known trilateration techniques).

The localization logic 160 may then determine timing offsets associated with the satellite signals from each of the one or more satellites based at least in part on the sensor data (730). For example, the localization logic 160 may determine the location of the vehicle based on the sensor data, and may use the vehicle's location to determine the accuracy of the satellite signals broadcast by the one or more satellites. More specifically, the example embodiments recognize that the sensor-based location information may be more accurate and precise than position information derived from the received satellite signals (e.g., due to weather, atmospheric conditions, buildings, and/or other obstructions that may interfere with the propagation of satellite signals toward the surface of the earth). Thus, for some embodiments, the localization logic 160 may determine timing offsets (e.g., differential correction factors) that may be used to calibrate the received satellite signals based on the known location of the vehicle (e.g., determined from the sensor data).

Figure 8:
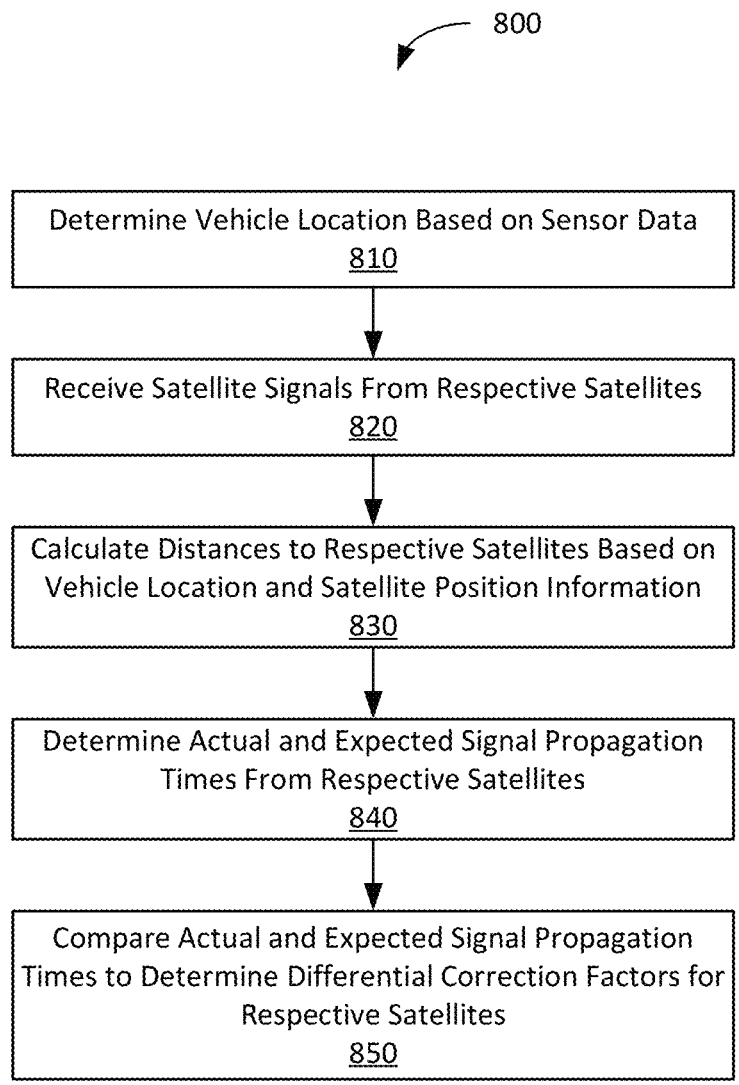
FIG. 8 shows a flowchart of an example operation for generating differential correction factors for one or more satellites of a satellite positioning system based on vehicle sensor data.

FIG. 8 shows a flowchart of an example operation 800 for generating differential correction factors for one or more satellites of a satellite positioning system based on vehicle sensor data. The operation 800 may be implemented, for example, by the sensor-based (SB) differential correction system 200 of FIG. 2. Accordingly, references made herein to the elements of FIG. 2 are for purposes of illustrating a suitable element or component for performing a step or sub-step being described.

The SB differential correction system 200 may first determine a vehicle location based on sensor data generated by one or more sensors provided on the vehicle (810). For example, the location mapper 210 may receive sensor data 201 from a set of local sensors (e.g., cameras, laser rangefinders, IMUs, etc.). In some aspects, the sensor data may be used to guide and/or navigate the vehicle through a given environment (e.g., in an autonomous manner). In example implementations, the location mapper 210 may compare the sensor data 201 with mapping information 202 stored in the map data store 212 to determine the location of the vehicle. For example, as described above with respect to FIG. 2, the sensor data 201 may be matched with corresponding descriptions of known locations (e.g., image and/or map data) to determine the precise location of the vehicle.

The SB differential correction system 200 may further receive satellite signals from respective satellites of a satellite positioning system (820). For example, the satellite receiver 220 may receive satellite signals 208 from one or more satellites. Each satellite signal 208 may include a pseudorandom number sequence that may be used to calculate the propagation time of the satellite signal (e.g., from a corresponding satellite to the satellite receiver 220). More specifically, each satellite signal 208 may include satellite position information 204 indicating the position (e.g., in space) of the corresponding satellite at the time the pseudorandom sequence was transmitted, and timing information 206 indicating a time of transmission (TOT) of the pseudorandom sequence. In some aspects, the timing information 206 may further include a time of arrival (TOA) of the pseudorandom sequence (e.g., as determined by the satellite receiver 220).

The SB differential correction system 200 may then calculate distances to respective satellites based on the vehicle location and the satellite position information (830). For example, the satellite distance calculator 232 may compare the location information 203 for the vehicle with the satellite position information 204 for a particular satellite to determine the distance from the vehicle to the particular satellite. As described above, with respect to FIG. 2, the example implementations presume that the distance information 205 may describe the "actual" distance (D) between the vehicle and the corresponding satellite.

The SB differential correction system 200 may determine actual and expected signal propagation times from the respective satellites (840). For example, the actual propagation times may represent the time it actually took for each satellite signal 208 to reach the satellite receiver 220 (e.g., including propagation delays due to weather, atmospheric conditions, and/or other obstructions), whereas the expected propagation times may represent the time it should have taken each satellite signal 208 to reach the satellite receiver 220 (e.g., assuming no propagation delays). In some aspects, the timing offset calculator 234 may determine the actual propagation time ($T_A$) of a particular satellite signal 208 by comparing the signal's TOT to the signal's TOA (e.g., TA=TOA−TOT). In other aspects, the timing offset calculator 234 may use the distance information 205 to determine the expected propagation time ($T_E$) of a particular satellite signal 208 (e.g., $T_E$=D/c, where c=speed of light).

Finally, the SB differential correction system 200 may compare the actual signal propagation times with the expected signal propagation times to determine differential correction factors for respective satellites (850). For example, the differential correction logic 230 may use the sensor-based location information 203 to determine the accuracy of the timing information 206 provided by the received satellite signals 208. In some implementations, the timing offset calculator 234 may determine a differential correction factor 207 (e.g., timing offset) associated with the satellite signals 208 of a particular satellite based on the difference between the actual propagation time and the expected propagation time (e.g., correction factor=$T_A$−$T_E$). The differential correction factors generated by the SB differential correction system 200 may be used by other satellite (e.g., GPS) receivers in the vicinity to adjust and/or calibrate their received satellite signals (e.g., as described above with respect to FIGS. 3 and 4).

Hardware Diagram

Figure 9:
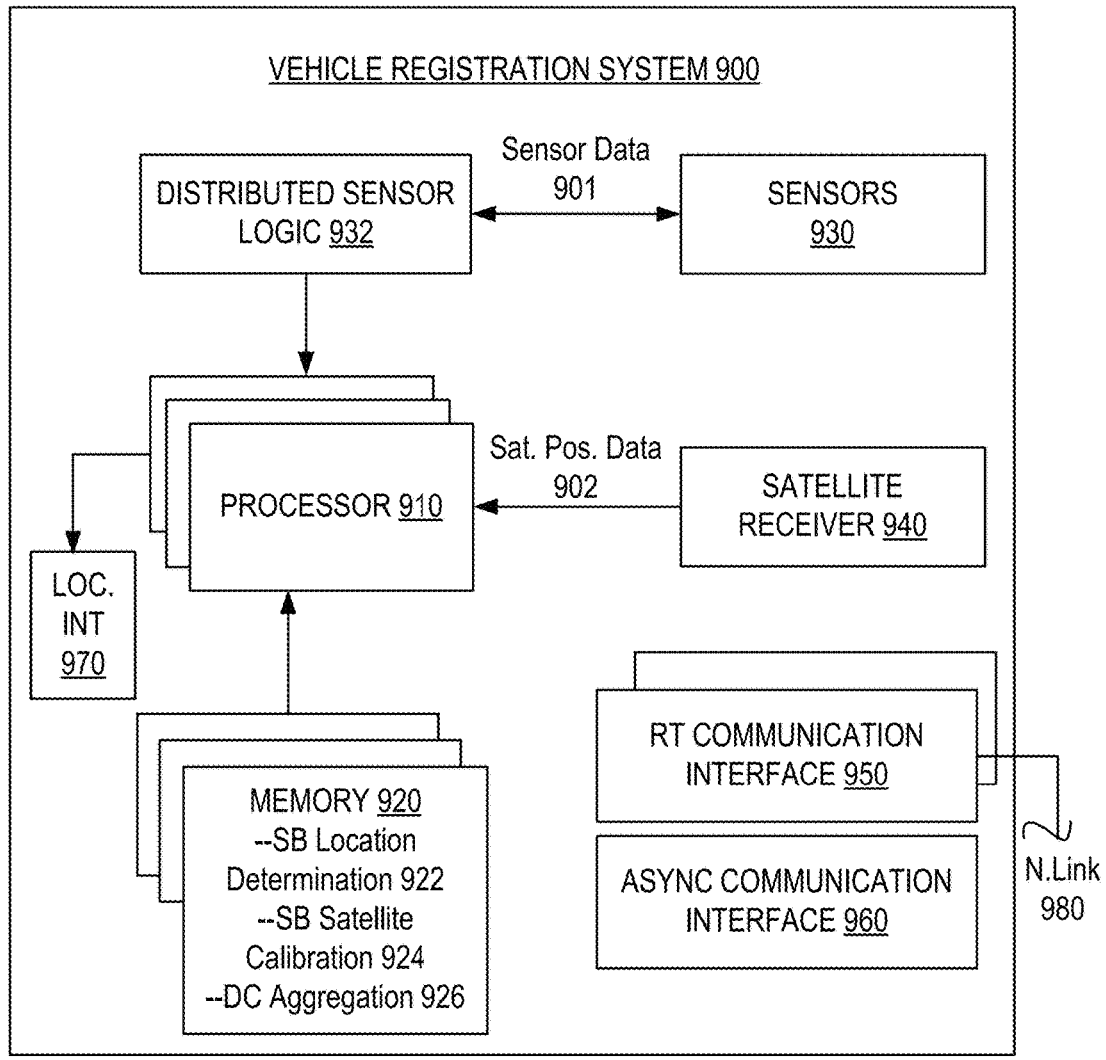
FIG. 9 shows a block diagram of a vehicle registration system that may be implemented on an autonomous vehicle, in accordance with example embodiments.

FIG. 9 shows a block diagram of a vehicle registration system 900 that may be implemented on an autonomous vehicle, in accordance with example embodiments. Alternatively, the vehicle registration system 900 may be implemented on one or more computing systems that communicate with a set of autonomous vehicles, such as described with an example of FIG. 5. The vehicle registration system 900 may be implemented using one or more processors 910, memory resources 920, a number on-board vehicle sensors 930, and a satellite receiver 940. In the context of FIGS. 1 and 2, the autonomous vehicle control system 100 and/or sensor-based differential correction system 200 may be implemented using one or more components of the vehicle registration system 900.

According to some examples, the vehicle registration system 900 may be implemented within an autonomous vehicle with software and hardware resources such as described with examples of FIGS. 1 and 2. In an example shown, the vehicle registration system 900 may be distributed spatially into various regions of a vehicle. For example, the processors 910 and/or memory resources 920 may be provided in the trunk of a vehicle. The various processing resources of the vehicle registration system 900 may also include distributed sensor logic 932, which may be implemented using microprocessors or integrated circuits. In some examples, the distributed sensor logic 932 may be implemented using field-programmable gate arrays (FPGA).

In an example of FIG. 9, the vehicle registration system 900 may include a local communication interface 970 (or series of local links) to vehicle interfaces and other resources of an autonomous vehicle. In one implementation, the local communication interface 970 provides a data bus or other local link to electro-mechanical interfaces of the vehicle, such as used to operate steering, acceleration and braking, as well as to data resources of the vehicle (e.g., vehicle processor, OBD memory, etc.). The vehicle registration system 900 may further include multiple communication interfaces, such as real-time (RT) communication interface 950 and asynchronous communication interface 960. The various communication interfaces 950 and 960 may send and receive communications to other vehicles, central services, human assistance operators, and/or other remote entities for a variety of purposes.

One or more of the communication interfaces 950 and/or 960 may enable the autonomous vehicle to communicate with one or more networks (e.g., Wi-Fi, satellite, and/or cellular network) through use of a network link 980, which can be wireless or wired. The vehicle registration system 900 may establish and use multiple network links 980 at the same time. Using the network link 980, the vehicle registration system 900 may communicate with one or more remote entities, such as network services or human operators. In one implementation, the real-time communication interface 950 may be optimized to communicate information instantly, in real-time to remote entities (e.g., human assistance operators). In contrast, the asynchronous communication interface 960 may communicate information at predetermined intervals and/or according to a schedule (e.g., vehicle status updates, software updates, etc.).

The memory resources 920 may include, for example, main memory, a read-only memory (ROM), storage device, and cache resources. The main memory of memory resources 920 may include random access memory (RAM) or other dynamic storage device, for storing information and instructions which are executable by the processors 910. The processors 910 may execute instructions for processing information stored with the main memory of the memory resources 920. The main memory may also store temporary variables or other intermediate information which may be used during execution of instructions by one or more of the processors 910. The memory resources 920 may include ROM or other static storage device for storing static information and instructions for one or more of the processors 910. The memory resources 920 may also include other forms of memory devices and components, such as a magnetic disk or optical disk, for purpose of storing information and instructions for use by one or more of the processors 910.

According to some examples, the memory 920 may store a plurality of software instructions including, for example, sensor-based (SB) location determination software 922, SB satellite calibration software 924, sensor data read software 1016, and differential correction (DC) aggregation software 926. During runtime (e.g., when the vehicle is operational), the software instructions 922-926 may be executed by one or more of the processors 910 in order to implement functionality such as described with respect to the autonomous vehicle control system 100 of FIG. 1 and/or the sensor-based differential correction system 200 of FIG. 2.

For example, in operating an autonomous vehicle, the one or more processors 910 may execute the SB location determination software 922 to determine a location of the autonomous vehicle based at least in part on sensor data 901 generated by the on-board vehicle sensors 930 (e.g., as described above with respect to FIGS. 1-3). For example, in executing the SB location determination software 922, the one or more processors 910 may compare the sensor data 901 with mapping information (e.g., image and/or map data) associated with one or more predetermined or known locations (e.g., stored by the memory resources 920) to determine the precise location of the autonomous vehicle.

Further, the one or more processors 910 may execute the SB satellite calibration software 924 to determine differential correction factors (e.g., timing offsets) that may be used to calibrate received satellite signals based on the location of the vehicle (e.g., as described above with respect to FIGS. 1-3). For example, in executing SB satellite calibration software 924, the one or more processors 910 may calculate distances to respective satellites based on the vehicle location, and may determine expected signal propagation times from the respective satellites based on the calculated distances. The one or more processors 910 may then compare the expected signal propagation times with the actual propagation times of the received satellite signals to determine propagation delays (e.g., represented by the differential correction factors) attributable to weather, atmospheric conditions, and/or other sources of interference.

In some aspects, the one or more processors 910 may execute the DC aggregation software 926 to combine and/or aggregate differential correction information collected from multiple sources, for the same satellites (e.g., as described above with respect to FIGS. 4-6). For example, in executing the DC aggregation software 926, the one or more processors 910 may combine the differential correction information generated by the vehicle registration system 900 with differential correction information received from other autonomous vehicles in the vicinity to determine more precise and/or accurate timing offsets to be applied to the received satellite signals.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method of calibrating satellite signals broadcast by one or more satellites of a satellite positioning system, the method comprising:
    receiving sensor data from one or more sensors provided on a vehicle;
    detecting satellite signals from the one or more satellites; and
    determining timing offsets of the satellite signals from each of the one or more satellites based at least in part on the sensor data, wherein determining the timing offsets of the satellite signals comprises determining a location of the vehicle by:
        comparing the sensor data to a map of registered locations; and
        determining a relative proximity of the vehicle to one or more of the registered locations based on comparing the sensor data to the map of registered location.

2. The method of claim 1, wherein the map of registered locations is generated based at least in part on previously-acquired sensor data.

3. The method of claim 1, wherein determining the timing offsets of the satellite signals further comprises:
    calculating respective distances to each of the one or more satellites based at least in part on the location of the vehicle.

4. The method of claim 3, wherein determining timing offsets of the satellite signals further comprises:
    determining propagation times of the satellite signals from each of the one or more satellites;
    calculating expected propagation times for the satellite signals based at least in part on the respective distances to each of the one or more satellites; and
    comparing the propagation times with the expected propagation times to determine the timing offsets.

5. The method of claim 1, wherein the one or more sensors includes at least one of a camera or a rangefinder.

6. The method of claim 1, wherein the sensor data corresponds to a three-dimensional (3D) sensor image.

7. The method of claim 1, further comprising:
    updating the timing offsets based at least in part on movements of the vehicle.

8. The method of claim 1, further comprising:
    communicating the timing offsets to one or more satellite receivers within a threshold proximity of the vehicle.

9. A satellite signal calibration system, comprising:
    one or more processors; and
    a memory storing instructions that, when executed by the one or more processors, cause the system to:
        receive sensor data from one or more sensors provided on a vehicle;
        detect satellite signals from one or more satellites of a satellite positioning system; and
        determine timing offsets of the satellite signals from each of the one or more satellites based at least in part on the sensor data, wherein execution of the instructions to determine the timing offsets of the satellite signals comprises determining a location of the vehicle by:
            comparing the sensor data to a map of registered locations; and
            determining a relative proximity of the vehicle to one or more of the registered locations based on comparing the sensor data to the map of registered locations.

10. The system of claim 9, wherein the map of registered locations is generated based at least in part on previously-acquired sensor data.

11. The system of claim 9, wherein execution of the instructions to determine the timing offsets further causes the system to:
    calculate respective distances to each of the one or more satellites based at least in part on the location of the vehicle.

12. The system of claim 11, wherein execution of the instructions to determine the timing offsets further causes the system to:
    determine propagation times of the satellite signals from each of the one or more satellites;
    calculate expected propagation times for the satellite signals based at least in part on the respective distances to each of the one or more satellites; and
    compare the propagation times with the expected propagation times to determine the timing offsets.

13. The system of claim 9, wherein the one or more sensors includes at least one of a camera or a rangefinder.

14. The system of claim 9, wherein the sensor data corresponds to a three-dimensional (3D) sensor image.

15. The system of claim 9, wherein execution of the instructions further causes the system to:
    update the timing offsets based at least in part on movements of the vehicle.

16. A non-transitory computer-readable storage medium containing instructions that, when executed by one or more processors of a satellite signal calibration system, causes the system to:
    receive sensor data from one or more sensors provided on a vehicle;
    detect satellite signals from one or more satellites of a satellite positioning system; and
    determine timing offsets of the satellite signals from each of the one or more satellites based at least in part on the sensor data;
    wherein execution of the instructions to determine the timing offsets causes the system to (i) determine a location of the vehicle based at least in part on the sensor data, (ii) calculate respective distances to each of the one or more satellites based at least in part on the location of the vehicle, (iii) determine propagation times of the satellite signals from each of the one or more satellites, (iv) calculate expected propagation times for the satellite signals based at least in part on the respective distances to each of the one or more satellites, and (v) compare the propagation times with the expected propagation times to determine the timing offsets.

* * * * *